Patented Nov. 3, 1942

2,300,393

UNITED STATES PATENT OFFICE 2,300,393

METHOD OF INCREASING FLUID PERMEABILITY OF EARTH OR ROCK FORMATIONS

George W. Ayers, Jr., Chicago, Ill., assignor to The Pure Oil Company, Chicago, Ill., a corporation of Ohio No Drawing. Application May 29, 1940, Serial No. 337,811

10 Claims. (Cl. 252—8.55)

This invention relates to a method of increasing the fluid permeability of earth or rock formations particularly in the vicinity of or contiguous to oil, gas, brine or water wells. The invention more particularly relates to the treatment of wells the fluid-bearing mineral structure surrounding which comprises sandstone or shale or other siliceous material.

Heretofore various methods have been proposed for increasing the flow of wells. Particularly in the case of oil wells such methods include drilling, "shooting" with explosives, and chemical treatment. The first two methods have a number of disadvantages, among which is the necessity of removing the pump rod and tube prior to applying the treatment. Furthermore, when explosive is used, there is danger of damaging the well casing or sealing off the producing stratum. The chemical methods heretofore proposed, such as treatment with hydrochloric acid solution, have been capable of successful use for increasing the output of only those wells in which the producing stratum is in limestone formation. Hydrofluoric acid has also been used, particularly in sandstone formations, but such material is not practical for the reason that when hydrofluoric acid acts upon siliceous material in the presence of water, gelatinous silica is precipitated which, when occurring in the pores of the producing formation, tends to retard rather than to increase the flow of fluid therefrom, thereby defeating the purpose of the treatment. Thus, by methods heretofore employed, it has been exceedingly difficult or impossible to increase by chemical treatment the output of wells in which the producing formation consists largely of sandstone or other siliceous minerals.

It is an object of this invention to provide a method of increasing the fluid permeability of earth or rock formations, particularly siliceous formations.

It is another object of this invention to provide a method whereby the yield of fluid from a well is increased.

It is another object of this invention to provide a method of increasing the flow of wells in which the producing formation comprises sandstone or other siliceous minerals.

It is a further object of this invention to provide a method of increasing the flow of fluids from oil wells, particularly those located in sandstone formations, by means of treatment of such wells and/or formations with chemical reagents.

Other objects of this invention will be apparent from the following detailed description.

As one illustration where the invention may be used, an oil or gas well which has ceased to flow or which is flowing at a reduced rate is treated by introducing into the well bore a suitable quantity of a fluid reagent comprising fluoboric acid. Such acid is capable of attacking sandstone or siliceous mineral in the producing formation and increasing its porosity and permeability whereby the flow of fluid from the producing formation may be increased when the well is put back into production.

Similarly, the reagent may be used to remove mud sheaths or other deposits which may form in the well bore and formations contiguous thereto as a result of the use of a circulating fluid of mud containing siliceous material in connection with drilling operations.

The reagent may be prepared by simply mixing solutions of hydrofluoric and boric acids. It may also be prepared by adding suitable fluoride or borate salts to mineral acid solution so that the fluorides and borates are converted to hydrofluoric and boric acids respectively, which then react to form the fluoboric acid. Suitable fluorides and borates are the sodium, potassium and ammonium salts, although other metallic fluorides and borates which are readily soluble in mineral acid may be used. Satisfactory treating reagent may be prepared by passing boron fluoride gas into aqueous hydrofluoric acid. A wide variation in the proportions of boron compound mixed with fluorine compound may be permitted, although best results are obtained when the molal ratio of fluorine to boron is not substantially in excess of 4 to 1. Preferred proportions are approximately 4 mols of fluorine to 1 of boron. This corresponds to the formula HBF$_4$ for fluoboric acid according to the equation:

$$H_3BO_3 + 4HF \rightarrow HBF_4 + 3H_2O$$

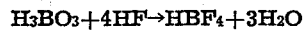

A small excess of hydrofluoric acid over and above the amount required to react with boric acid according to the foregoing equation may be used, but large excesses of hydrofluoric acid are to be avoided as clogging of the treated formation may occur. The amount of excess free hydrofluoric acid should not exceed approximately 50% by weight of the amount of fluoboric acid present in the solution. A suitable corrosion inhibitor may be added to the fluoboric acid reagent to minimize the effect of the acid upon metallic parts of the well with which the reagent comes in contact. The quantity of acid used will depend upon the size of the well and upon the condition of the producing formation at the time of treatment.

Usually the quantity of acid ranges from approximately 50 to 100 or more barrels. The fluoboric acid may vary widely in concentration, although concentrations from approximately 10% by weight up to about 90% of the maximum amount soluble in the particular solution have been found to be particularly effective. The treatment may be confined to a single application or may be repeated one or more times at intervals in order to further increase the flow of fluid from the producing formation. The well may be treated with solutions of fluoboric acid or materials which form fluoboric acid may be separately injected into the well and the fluoboric acid formed in situ.

In order to demonstrate the increase in porosity of sandstone after treatment with fluoboric acid, a section of a typical sandstone core obtained from the Dawes, West Virginia, field and identified as sandstone disc number 13 was sealed in a lead tube and the rate of flow of distilled water through the sandstone disc was carefully measured under constant pressure before and after treatment with the acid reagent. Acid reagent for this experiment was prepared by adding 61.8 grams of solid boric acid to 166.8 grams of 48% aqueous hydrofluoric acid. This produced a fluoboric acid reagent containing 38.4% by weight of fluoboric acid ($HBF_4$). All tests were carried out under 20 pounds per square inch nitrogen pressure. Prior to treatment the flow of water through the sandstone disc was at a rate of 0.62 cc. per minute. After draining the water from the disc, fluoboric acid reagent was applied and within 13 minutes and 55 seconds 99 cc. of acid reagent flowed through the disc. After the acid treatment, water was again forced through the disc in order to completely remove the acid before any measurement of flow was made. The disc was allowed to stand overnight and the next morning further quantities of water were forced through the disc and the rate of flow carefully measured. It was found that approximately 550 cc. of water flowed through the disc at an average rate of 8.3 cc. per minute or over 13 times the rate of flow of water through the disc prior to treatment with the acid reagent.

When similar sandstone discs were treated with hydrofluoric acid solutions and the acid washed out with water in the same manner as carried out in the treatment outlined with fluoboric acid, the discs were substantially completely plugged, particularly after the discs had been allowed to stand for a short time, such as overnight.

The efficacy of the fluoboric acid treatment can be further enhanced by subsequently treating the formation with a mineral acid such as hydrochloric acid, which contains no appreciable amount of hydrofluoric acid. To determine the efficacy of a hydrochloric acid treatment subsequent to the fluoboric acid treatment, sandstone disc number 13, which had been treated with fluoboric acid as previously described, was treated with 100 cc. of 35% aqueous hydrochloric acid solution. After washing the acid out, the rate of flow of water through the disc under 20 pounds per square inch nitrogen pressure was 36.6 cc. per minute. It is thus seen that the porosity of sandstone may be further increased when the treatment with fluoboric acid is followed by treatment with hydrochloric acid. The concentration of hydrochloric acid solutions used may range from about 10% by weight to substantially saturated solutions. Ordinary commercial concentrated hydrochloric acid which contains about 35% by weight of hydrogen chloride has been found entirely satisfactory. While hydrochloric acid is preferably used subsequent to treatment with fluoboric acid, good results may also be obtained by using a mixture of fluoboric and hydrochloric acids.

It is evident from the foregoing results that the permeability of the sandstone disc after treatment with fluoboric acid reagent containing hydrofluoric acid was greatly increased. A similar increase in porosity occurs when the reagent is applied to the producing formation in the well. The increase in porosity, as might be expected, decreases the resistance to flow of fluids such as oil and gas with a proportionate increase of flow of such fluids when the well is put back into production. While fluoboric acid reagent was prepared by adding solid boric acid to aqueous hydrofluoric acid solution in the example described, the invention is not limited to this method of preparation but includes all solutions of fluoboric acid however prepared and even those containing free hydrofluoric acid.

While various embodiments of the invention have been described, it will be understood that the invention is not limited thereby but may be otherwise practiced or carried out within the scope of the appended claims.

What is claimed is:

1. The method of increasing production of oil from wells in siliceous formations which comprises treating such formations with fluoboric and hydrofluoric acids, the amount of hydrofluoric acid being less than 50% by weight of the fluoboric acid.

2. Method in accordance with claim 1 in which the formations are treated with hydrochloric acid subsequent to treatment with fluoboric and hydrofluoric acids.

3. Method in accordance with claim 1 in which the fluoboric acid is in the form of an aqueous solution of approximately 38% by weight concentration.

4. The method of increasing the fluid permeability of siliceous earth formations which comprises introducing into a formation, aqueous reagent containing not substantially less than 10% by weight of fluoboric acid, permitting the reagent to act upon the formation, introducing into the formation a reagent containing not substantially less than 10% by weight of hydrochloric acid, permitting said last-mentioned reagent to react with the formation and with reaction products of the previous treatment contained therein and withdrawing spent reagent.

5. Method in accordance with claim 4 in which the concentration of fluoboric acid in the first-mentioned reagent is approximately 38% by weight.

6. The method of increasing production of oil from wells in siliceous formations which comprises treating such formations with a reagent containing not substantially less than 10% by weight of fluoboric acid.

7. In the treatment of inorganic earth formations containing silicon-oxygen compounds, the step which comprises applying thereto reagent containing sufficient fluoboric acid to react with the silicon-oxygen compounds in said formations to increase the permeability of said formations.

8. Method in accordance with claim 7 in which the molal ratio of fluorine to boron in the reagent is not substantially in excess of 4 to 1.

9. The method of increasing the fluid permeability of inorganic earth formations containing silicon-oxygen compounds which comprises introducing into such formations a reagent containing aqueous solutions of fluoboric and hydrofluoric acids in sufficient amounts to react with the silicon-oxygen compounds in said formations, permitting the reagent to react with the formations and withdrawing spent reagent.

10. Method in accordance with claim 9 in which the reagent contains from approximately 10% by weight up to about 90% by weight of the maximum amount of fluoboric acid soluble in the reagent.

GEORGE W. AYERS, Jr.